US006501753B1

United States Patent
Lin et al.

(10) Patent No.: US 6,501,753 B1
(45) Date of Patent: Dec. 31, 2002

(54) ARCHITECTURE AND METHOD FOR USING AN ADVANCED INTELLIGENT NETWORK (AIN) TO REDUCE VOICE SWITCH AND TRUNK LOADING

(75) Inventors: Kailih David Lin, Boulder, CO (US); Douglas A. Corey, Boulder, CO (US); Lawrence A. Behmer, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 08/715,985

(22) Filed: Sep. 19, 1996

(51) Int. Cl.[7] .................................................. H04L 12/66
(52) U.S. Cl. ......................................... 370/356; 370/474
(58) Field of Search .................................. 370/351, 352, 370/353, 354, 355, 383, 389, 390, 392, 401, 408, 410, 466, 474, 537, 538, 539, 356; 379/90.01, 230, 219, 229, 201, 220, 88.17, 93.01

(56) References Cited

U.S. PATENT DOCUMENTS

| 4,597,077 A | 6/1986 | Nelson et al. ................. 370/88 |
| 5,423,003 A | 6/1995 | Berteau ....................... 395/200 |

(List continued on next page.)

FOREIGN PATENT DOCUMENTS

WO  WO 97/28628  * 8/1997  ............. H04L/12/56

OTHER PUBLICATIONS

Robin Gareiss "Voice Over the Internet." Data Communications, Sep. 1996.*

Yang, C. "RFC 1789: INETPhone: Telephone Services and Servers on Internet." Apr. 1995.*

Primary Examiner—Kwang B. Yao
(74) Attorney, Agent, or Firm—Marsh Fischmann & Breyfogle LLP

(57) ABSTRACT

Architecture and a method for reducing voice switch and trunk loading is disclosed. In one embodiment, a system for handling a voice frequency data call to a first termination telephone number associated with a service provider includes a first processor for recognizing and routing the voice frequency data call toward a data network via a first network modem and a converter for receiving the voice frequency data call from the first network modem and packetizing the voice frequency call into a packet switch call having at least a first packet transmittable toward the service provider via the data network interconnectable to the service provider. A method for handling such voice frequency data calls from a first person to a service provider includes the steps of recognizing the voice frequency data call corresponds to a service provider, processing at least the first termination telephone number to direct the routing of data in the voice frequency data call toward a data network, and processing the voice frequency data call to convert it to a packet switch call having at least a first packet transmittable toward the service provider via the data network.

34 Claims, 11 Drawing Sheets

U.S. PATENT DOCUMENTS

| | | | |
|---|---|---|---|
| 5,438,568 A | 8/1995 | Weisser, Jr. | 370/60 |
| 5,438,614 A | 8/1995 | Rozman et al. | 379/98 |
| 5,440,547 A | 8/1995 | Easki et al. | 370/60 |
| 5,450,408 A | 9/1995 | Phaal | 370/85.13 |
| 5,481,544 A | 1/1996 | Baldwin et al. | 370/94.1 |
| 5,490,007 A | 2/1996 | Bennett et al. | 359/139 |
| 5,490,252 A | 2/1996 | Macera et al. | 395/200.01 |
| 5,511,168 A | 4/1996 | Perlman et al. | 395/200.15 |
| 5,519,772 A | 5/1996 | Akman et al. | 379/265 |
| 5,526,359 A | 6/1996 | Read et al. | 370/100.1 |
| 5,528,595 A | 6/1996 | Walsh et al. | 370/85.13 |
| 5,604,737 A * | 2/1997 | Iwami et al. | 370/352 |
| 5,610,910 A * | 3/1997 | Focsaneanu et al. | 370/351 |
| 5,724,355 A * | 3/1998 | Bruno et al. | 370/401 |
| 5,724,412 A * | 3/1998 | Srinivasan | 379/93.23 |
| 5,751,706 A * | 5/1998 | Land et al. | 370/352 |
| 5,768,513 A * | 6/1998 | Kuthyar et al. | 395/200.34 |
| 5,790,548 A * | 8/1998 | Sistanizadeh et al. | 370/401 |
| 5,793,762 A * | 8/1998 | Penners et al. | 370/389 |
| 5,805,587 A * | 9/1998 | Norris et al. | 370/352 |
| 5,809,118 A * | 9/1998 | Carmello et al. | 379/102.02 |
| 5,828,666 A * | 10/1998 | Focsaneanu et al. | 370/389 |
| 5,848,143 A * | 12/1998 | Andrews et al. | 379/219 |
| 6,067,350 A * | 5/2000 | Gordon | 379/90.01 |
| 6,069,890 A * | 5/2000 | White et al. | 370/352 |

* cited by examiner

ARCHITECTURE AND METHOD FOR USING AN ADVANCED INTELLIGENT NETWORK (AIN) TO REDUCE VOICE SWITCH AND TRUNK LOADING

FIELD OF THE INVENTION

The present invention generally relates to a system and method for processing telephone calls, and in particular, a system and method for handling voice frequency modem calls from modem users to service providers.

BACKGROUND OF THE INVENTION

Over the years, various devices and methods have been developed to facilitate communication between parties. For example, for purposes of allowing individuals to communicate to each other via a telephone associated with each party, a circuit switch or voice telephone network was developed to provide a system by which voice signals between individuals may be exchanged. In such cases, voice communication between specific parties is established via a dedicated circuit in the voice telephone network. Typical voice communication telephone calls last, on average, about three or four minutes.

In other instances a party having a work station or personal computer and a modem may place a telephone call to a service provider (e.g., Internet service provider, on-line provider, corporate networks) having a modem to establish data communications between the party and the service provider. In such instances, communication between the two modems also utilizes the voice telephone network. However, such data communications telephone calls over the voice telephone network typically last much longer than the average voice communication telephone calls, and, in fact, may last fifteen to twenty minutes, or even hours at a time. In view of such durations and the fact that each voice or data telephone call utilizes a dedicated circuit for each call, the voice telephone networks are subject to overloading. Furthermore, as data traffic over voice telephone network is typically sent at a rate of only about 28.8 kilobits per second while the system can accommodate traffic sent at a rate of about 64 kilobits per second, only a fraction of the capability of the voice telephone network is utilized in data telephone calls. Furthermore, actual data rates are, on average, much lower (e.g., 5 kilobits per second).

SUMMARY OF THE INVENTION

Accordingly, it is an object of the present invention to provide a system and method for efficiently and economically handling a voice frequency call between a modem user and a service provider.

It is another object of the present invention to provide a system and method for interconnecting a modem user and a service provider while reducing voice switching and trunk loading.

To achieve one or both of these objectives, the present invention concerns a system for handling at least a first voice frequency data call from at least a first person or first modem user to a first service provider by routing data (e.g., modem data, Integrated Services Digital Network ("ISDN") B channel data) from such voice frequency data calls toward the service provider over a data network (e.g., packet switched data network). In one aspect, in order to handle a first voice frequency modem call, the system for handling such voice frequency calls includes a means for recognizing and directing the routing of at least a first voice frequency call to a first network modem (e.g., interconnecting a voice frequency call to an available modem located in a central office), and a converter, interconnected to (e.g., in electrical communication with) the means for recognizing and directing, for receiving data from the first voice frequency call via the first modem and packetizing the first voice frequency call into a packet switch call having at least a first packet, which is transmittable toward the first service provider via a data network interconnectable to the first service provider. As such, voice switch and trunk loading on circuit switched voice networks is reducible.

Of importance, the system utilizes an Advanced Intelligent Network ("AIN") and an associated switch to efficiently recognize that a voice frequency modem call from a modem user to a specific service provider is subject to special call processing and to provide information on how the modem call is to be routed (e.g., towards the service provider via a network modem and the data network). In this regard, in one embodiment, the means for recognizing and directing includes a receiver (e.g., switch) which is capable of recognizing that the voice frequency modem call is subject to special processing and generating at least a first message having a query corresponding at least to the first termination telephone number, and a processor, interconnected to (e.g., in electrical communication with) the receiver, which is capable of retrieving from a database associated with the processor information in response to the first message to direct the routing of the first voice frequency call toward the data network via a first modem (e.g., any available modem) in a modem bank. More specifically, in one embodiment, the receiver includes an AIN capable switch having an AIN trigger capable of generating the first message upon receipt and identification of a voice frequency call to a specific number associated with the service provider. In another embodiment, the processor includes a Service Control Point ("SCP") for retrieving information corresponding to the first termination telephone number from the database associated with the SCP and for generating a message to direct the routing of the voice frequency call to a data network via a first modem.

The converter for assembling packets of data is generally capable of converting voice frequency calls into packet switch calls having at least a first packet. As such, the converter is capable of receiving the output from a first modem, namely, the data in the voice frequency call from the first person, and packetizing the data for transport toward the appropriate service provider over the data network. For purposes of routing the packets within the data network, the packetizer may also address each packet with at least a destination address corresponding to the service provider and an originating address corresponding to the first person (e.g., the converter port through which the voice frequency modem call is routed). For purposes of properly addressing each packet, the packetizer may obtain the service provider's address and/or routing instructions by interfacing with the AIN directly or by interfacing with the receiver (e.g., switch). In instances where at least a second modem user wishes to establish modem or ISDN B-channel data communication with the first service provider or a second service provider, the system may further include a multiplexer for multiplexing packets of data for transport toward the appropriate service provider via the data network.

For purposes of delivering data from the voice frequency call to a service provider not having the capability and/or desire to receive packetized and/or multiplexed data, the system may further include a packet disassembler for depacketizing packets and/or for demultiplexing packets. In one embodiment, where packetized data from modem users'voice frequency modem calls is to be delivered from the data network to the service provider via a channelized T-1 data delivery system (e.g., T-1 line), the system of the present invention includes a depacketizer and second modem associated with the service provider to deliver strings of data to the service provider. In another embodiment, where packetized data from modem users'voice frequency modem calls is to be delivered from the data network to the service provider as a Voice Frequency/Twisted Pair ("VF/TP") data stream, the system of the present invention includes a diassembler for depacketizing and/or demultiplexing the packets. Otherwise, where the service provider is interconnectable (e.g., electrically linkable) to the data network and has the capability and/or desire to demultiplex and/or depacketize packets, the data from modem users may be delivered to the appropriate service provider via the data network as multiplexed and packeted data.

In another aspect, the present invention concerns a method for handling at least a first voice frequency data call (e.g., modem data, ISDN B-channel data) to/from at least a first modem user from/to a first termination telephone number associated with a first service provider, which includes the steps of recognizing the first voice frequency data call from the first modem user corresponds to the first service provider, directing the routing of the first voice frequency data call toward a data network via a first network modem, and processing the voice frequency data call, and specifically the data of the voice frequency data call, to convert the first voice frequency data call into a first packet switch call having at least a first packet transmittable toward the first service provider via the data network linkable to the first service provider. The first packet corresponds to data included in the first voice frequency data call. In this regard, the method of the present invention alleviates voice switch and trunk loading as communicating between modem users and service providers can be more efficiently established via a data network.

In one embodiment of the method of the present invention, the step of recognizing a first voice frequency modem call includes the steps of receiving the first voice frequency modem call from the first person (e.g., first modem user) via a first user modem associated with the first person and identifying that the first voice frequency modem call corresponds to the first service provider and, as such, warrants special processing. In order to obtain information regarding treatment of the first voice frequency modem call, the step of directing the routing includes the steps of processing at least the first termination telephone number to retrieve information concerning the routing of the first voice frequency modem call and routing the first voice frequency modem call to the data network via the first network modem.

In one embodiment, an AIN is utilized to perform the steps of processing at least the first termination telephone number to obtain information and providing instructions to route the first voice frequency modem call. More specifically, in this embodiment, the steps of processing the first voice frequency call and routing includes the steps of generating a first message to request data corresponding to at least the first termination telephone number, searching, in response to the first message, a database to retrieve data corresponding to at least the first termination telephone number, the data being stored in the database, and generating a second message to direct the routing of the voice frequency call to the first network modem, the second message being based upon data retrieved during the searching step. In one embodiment, the steps of receiving the voice frequency call and generating the first message to request information or data concerning how to route or process the voice frequency call is performed by an AIN capable switch, and specifically, an AIN trigger associated therewith. In another embodiment, the AIN, and specifically, a Service Control Point, is utilized to perform the steps of searching the database and generating the second message to direct the routing of the voice frequency call.

The step of processing the voice frequency call generally concerns converting the voice frequency modem call, and specifically, data from the voice frequency call, into a form which is transportable in the data network. In one embodiment, the step of processing the voice frequency call includes the step of packet assembling (e.g., packetizing) the data from the voice frequency call into a packet switch call having at least a first packet of data. The processing step may also include the step of addressing each of the packets to facilitate routing of the packets toward the first service provider via the data network. Addresses for services providers may be obtained by receiving such addresses from the receiver (e.g., AIN capable switch) or alternatively, from the AIN directly or, in another embodiment, from another database server. In another embodiment, where a second packet corresponding to a second person is to be transmitted toward the first service provider or a second service provider via the data network, the method of the present invention further includes the step of multiplexing at least the first and second packets corresponding to the first and second persons, respectively, for transport toward the appropriate service provider via the data network. In this regard, a plurality of multiplexed packets are substantially simultaneously transmittable toward the appropriate service provider via the data network.

The method of the present invention may further include the step of transmitting at least the first packet towards the first service provider via the data network which is interconnectable to the first service provider. In one embodiment, where the first service provider has the capability to disassemble (e.g., demultiplex and/or depacketize) packets, the method further includes the step of delivering at least a first packet to the first service provider over the data network. In another embodiment, where the first service provider does not have the capability and/or the desire to demultiplex (e.g., in instances where at least a second packet from a second person is multiplexed with the first packet) and/or depacketize packets, the method may further include the steps of disassembling (e.g., demultiplexing and/or depacketizing) at least the first packet to convert the packet switch call back to a voice frequency call and delivering data to the first service provider via VF/TP data delivery devices. In yet another embodiment, where the service provider does not have to the capability and/or the desire to demultiplex (e.g., in instances where at least a second packet from a second person is multiplexed with the first packet) and/or depacketize packets, the method of the present invention further includes the steps of disassembling (e.g., demultiplexing and/or depacketizing) at least the first packet into at least a first data string corresponding to data from the voice frequency call from the first person and delivering at least the first data string to the first service provider via a second modem associated with the service provider and a T-1 line (e.g., channelized T-1 data delivery).

DETAILED DESCRIPTION

The system and method of the present invention is used to generally handle calls from at least one modem user to at least one service provider (e.g., Internet service providers, on-line providers, corporate networks, etc.). In particular, the system and method of the present invention contemplate processing an incoming voice frequency modem telephone call from a modem user to convert it to a packet switch call having at least a first packet transmittable toward a service provider over a data network linkable with the service provider. In this regard, the system and method of the present invention concern utilizing an AIN architecture to efficiently handle such incoming voice frequency modem telephone calls from modem users to service providers in order to reduce voice switch and trunk loading by processing and placing such calls on a data network.

Figure 1:
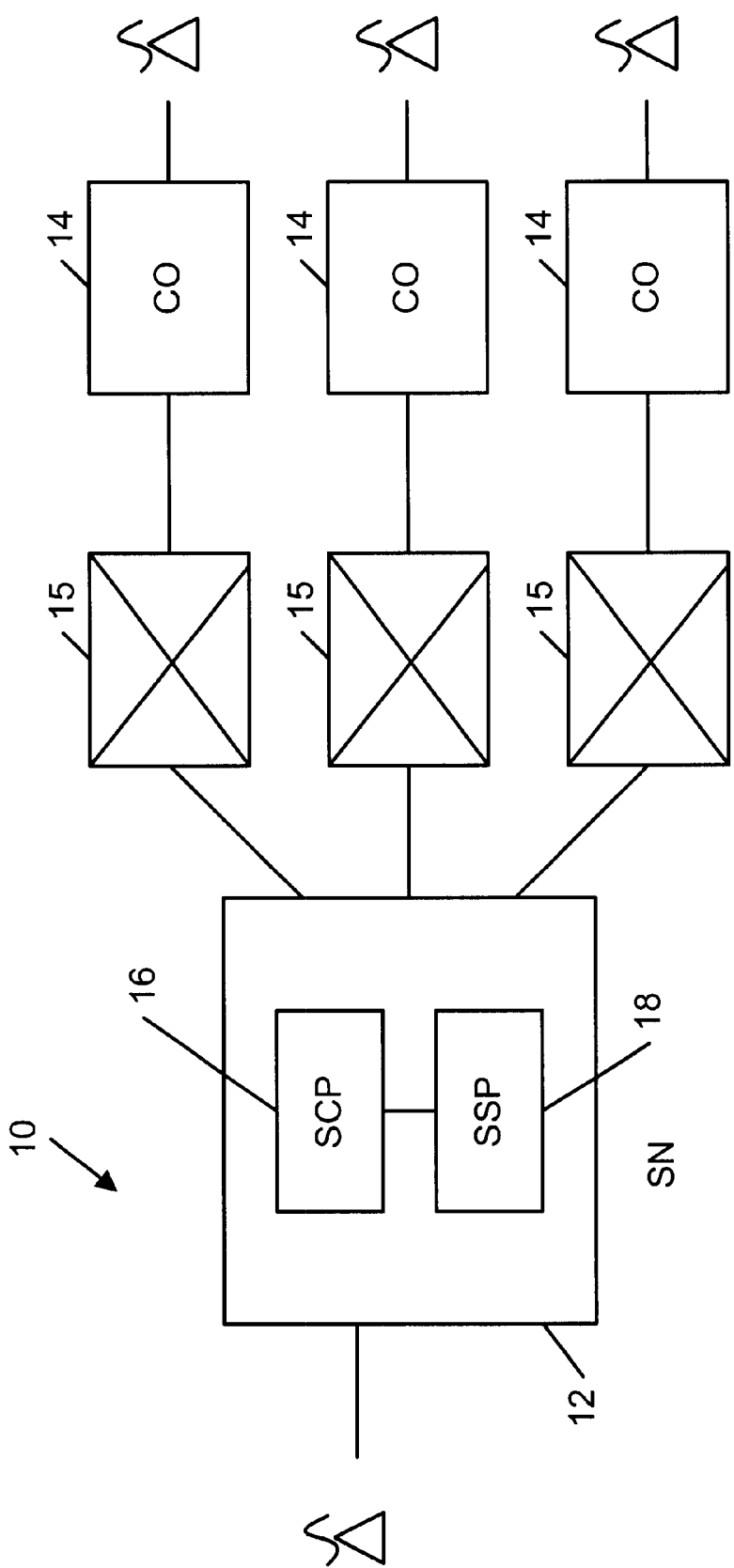
FIG. 1 is a diagrammatic illustration of an Advanced Intelligent Network ("AIN") having switch interconnected to a plurality of central offices.

A basic AIN architecture, which is generally described in U.S. Pat. Nos. 5,479,495, 5,425,091 and 5,438,568, all of which are incorporated by reference herein in their entirety, is generally illustrated in FIG. 1 and denoted by reference numeral 10. The network 10 is typically used in a Public Switched Telephone Network ("PSTN") and generally includes at least one switch or service node 12 in electrical communication with a plurality of central offices 14 via Service Transfer Points ("STP") 15, which are packet switches used to route signaling messages within the network 10. The network 10 also typically includes a Service Control Point ("SCP") which contains the service logic and associated data support as well as sufficient memory to execute customer services. The network 10 further includes Service Switching Point ("SSP") 18 which is a node (e.g., the subscriber's local switch/central office switch) that recognizes "triggers" used when a subscriber invokes an intelligent network service and then communicates with the SCP to operate the service. SSP 18 and SCP 16 are provided in electrical communication within the service node 12 and may, in some instances, be combined in a single device known as a Service Switching Control Point (SSCP) wherein the functions of the SCP and the SSP are combined.

The network 10 may be implemented with common channel Signaling Service No. 7, which is capable of controlling low-speed analog facilities as well as high-speed digital networks. Common channel SS7 is also capable of operating at 64 kb/s and can support variable message links up to 2,176 bits (272 octets) of information per message. The AIN architecture described hereinabove is generally known to those skilled in the art to permit services to be extended through the network.

In operation, and as those skilled in the art will recognize, an AIN release (e.g., 0.0, 0.1, 0.2) service node is a switch that can recognize a call that requires AIN processing by an SCP, without making any assumptions about the service being provided. The switch does so by temporarily suspending call processing, and assembling and launching a query to the SCP. The subsequent SCP reply gives the switch information on how to continue processing the call. Triggering is the AIN process of identifying calls that need AIN handling. In this regard, upon encountering a trigger, a service node suspends normal call processing and moves to the next step, code gapping.

In one embodiment of a system 30 of the present invention, illustrated in FIG. 2, the system 30 is provided for use in an AIN of the type described hereinabove (e.g., AIN Release 0.0, 0.1, 0.2). Generally, in order to reduce voice switching and trunk loading on circuit switched voice networks, the system 30 is capable of handling voice frequency modem calls from modem users to service providers by routing data from such modem calls toward the service providers via a packet switched data network. More specifically, for purposes of handling at least first and second incoming voice frequency modem calls from at least first and second modem users 32, 35 to at least a first service provider 33 and/or a second service provider 37 via a first and/or second termination telephone number associated with the first and/or second service provider 33, 37, the system 30 includes a receiver or central office switch 34 (e.g., Originating Class V Switch) for receiving and generating at least a first message having a query corresponding to the termination telephone numbers, a service control point ("SCP") 60, in electrical communication with the switch 34 via common channel SS7, for providing information corresponding to the service provider(s) 33, 37 to the switch 34, and a processor for converting the incoming voice frequency modem calls into packet switch calls having at least first and second packets corresponding to data in the first and second voice frequency modem calls, which are transmittable toward the appropriate service provider(s) 33, 37 via a data network 70, the data network 70 being linkable to the first and/or second service provider(s) 33, 37. In this regard, as the system 30 of the present invention is capable of processing at least the first voice frequency modem call to convert the first voice frequency modem call into a packet switch call having at least a first packet of data or information corresponding to the first modem user 32, and transporting at least the first packet toward the first and/or second service providers 33, 37 via a packet switched data network 70, the system 30 reduces voice switch and trunk loading.

Figure 2:
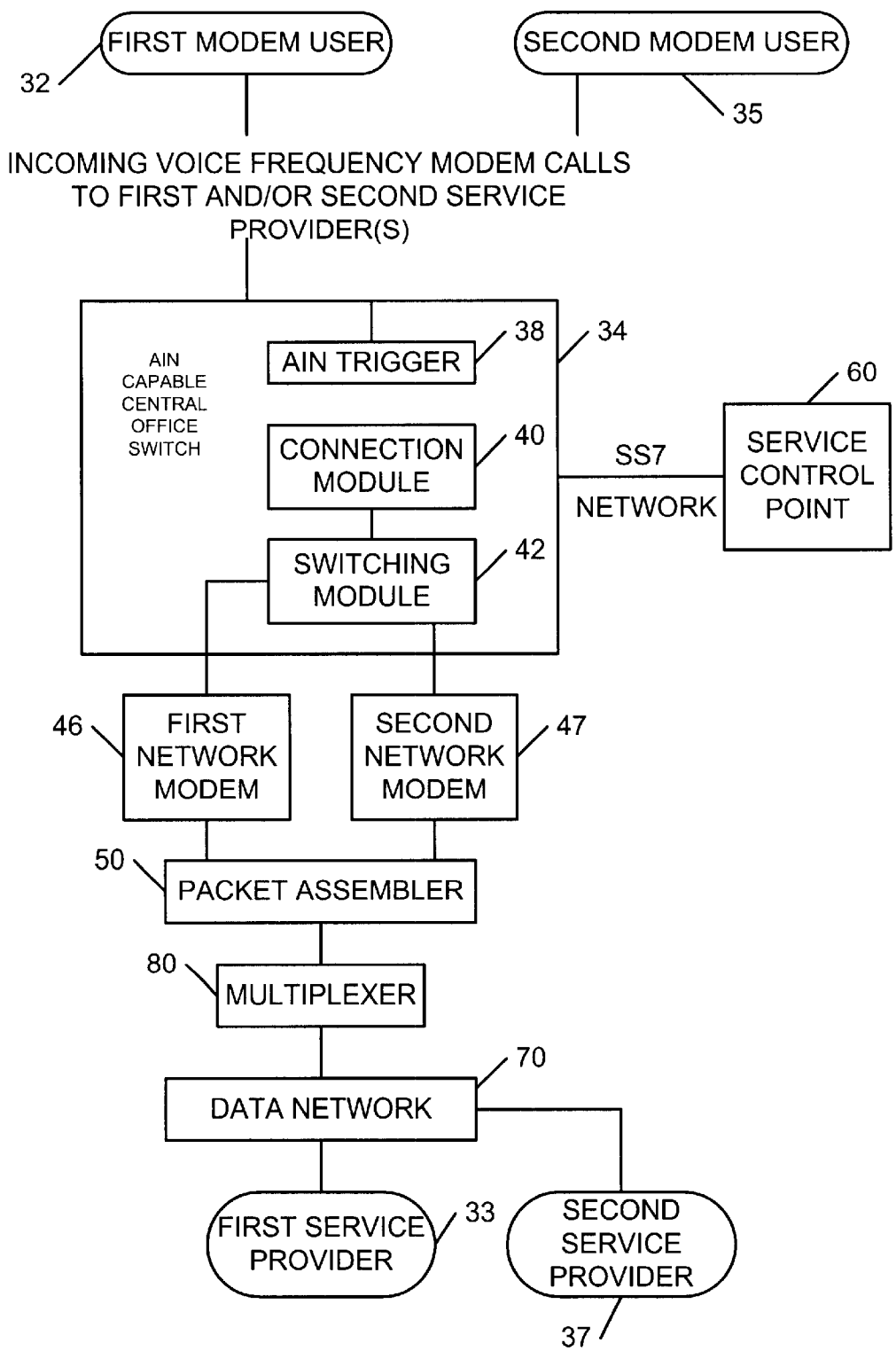
FIG. 2 is a diagrammatic illustration showing one embodiment of the system for using AIN to reduce voice switch and trunk loading, according to the features of the present invention.

As illustrated in FIG. 2, for purposes of processing at least the first incoming voice frequency modem call from the first modem user 32 (e.g., first person using a modem for data call) and ensuring that the first modem user is interconnected with the appropriate service provider, namely, the first service provider 33, the system 30, and specifically, the AIN central office switch 34 (e.g., an Originating Class V Switch) is capable of receiving an incoming voice frequency modem call from at least the first modem user 32 via a first user modem (not shown) associated with the first modem user 32 and a first termination telephone number associated with the first service provider 33 and recognizing that the incoming voice frequency modem call corresponds to the first service provider 33. In particular, in order to recognize that the incoming call requires AIN processing via the SCP 60, the switch 34, and specifically, an AIN trigger 38 associated with the switch 34 is capable of receiving the incoming voice frequency modem call from the first modem user 32, temporarily suspending call processing of the modem call and generating a message (e.g., query) to be sent to the SCP 60 in order to determine how to continue processing the modem call from the first modem user 32. In this regard, for purposes of recognizing that the modem call from the first modem user 32 to the first service provider 33 requires special processing according to the principles of the present invention, the switch 34 includes an AIN trigger 38. In one embodiment of the present invention, the AIN trigger 38 is an Information Collected Trigger Detection Point, which is commercially available from various vendors, (e.g., Lucent, Nortel). The central office switch 34 having AIN capability is a conventional system available from a variety of vendors (e.g., 5ESS switch or 1ASS switch available from Lucent, DMS-100 switch available from Nortel, AXE10 switch available from Ericsson). In addition, for purposes of providing AIN capability, the central office switch 34 may comprise AIN compliant software (e.g., AIN 0.1 release), which is commercially available from various vendors.

As noted hereinabove, the switch 34, and in particular, the AIN trigger 38, is capable of receiving the incoming voice frequency modem call from at least the first modem user 32 and generating at least a first message having a query in order to obtain information from the SCP 60 concerning how the modem call is to be processed. In this regard, the SCP 60, which is in electrical communication with the central office switch 34 (e.g., via a Transaction Capability Application Part signaling protocol), includes a database having information or data corresponding at least to the first service provider 33, and is capable of searching for and retrieving such information based upon the first message from the AIN trigger 38. The first message having a query corresponds to at least the first termination telephone number associated with the first service provider 33. As such, the information retrieved by the SCP 60 from the database associated therewith generally corresponds to how the modem call should be routed to the service provider having the first termination telephone number. In this regard, the SCP 60, in response to the first message from the AIN trigger 34 and the information retrieved from the database associated therewith, is capable of generating and sending to the switch 34 a message or instruction corresponding to the appropriate routing of the modem call, the switch 34 being capable of routing the modem call in accord with such an instruction from the SCP 60. As such, where, for example, the first termination telephone number corresponds information or data in the database of the SCP 60 indicating that the modem call is for a specific service provider 33, the SCP 60 generates an instruction to the switch 34, which is located in a central office, to direct the routing of the voice frequency modem call to a first network modem 46 within the central office, the modem 46 being in a modem bank. Where no information is retrieved, the SCP 60 may generate an instruction to direct the switch 34 to route the modem call to the service provider over a circuit switched voice network (e.g., VF/TP data delivery systems, which are known by those skilled in the art). Such an SCP 60 capable of retrieving such information and generating an instruction based upon such information is commercially available from various vendors (e.g., Lucent and Nortel).

As the central office switch 34 is capable of handling modem calls from a plurality of modem users to a plurality of service providers, as illustrated in FIG. 2, such instructions from the SCP 60 generally direct the switch 34 to route each modem call to a modem bank within the central office (e.g. an originating central office or a central office interconnected thereto), and specifically, to any available modem in the modem bank. In this regard, a data network interconnection between at least the first modem user and the service provider can be established. For example, and as illustrated in FIG. 2, a first voice frequency modem call from a first modem user 32 to a first service provider 33 may be routed to a first network modem 46 via a connection module 40 and switching module 42, which are capable of mapping and/or routing such calls in accordance with the instruction from the SCP 60. A second voice frequency modem call from a second modem user 35 to the first service provider 33 or a second service provider 37 may be routed to a second network modem 47. Likewise, a third frequency modem call from a third modem user (not shown) to one of the first and second service providers 33, 37 or to a third service provider may be routed to a third network modem. In this regard, the switch 34, and specifically, the connection and switching modules 40, 42 are capable of routing at least the first voice frequency modem call from the first modem user 32 to the first network modem 46, which may be located within the central office, in accordance with the information retrieved from and instructions generated by the SCP 60.

For purposes of interconnecting at least the first modem user 32 and the first service provider 33 via a data network 70 interconnectable thereto (which will be described in more detail hereinbelow), the system 30 includes a packetizer or packet assembler 50, which is capable of converting the data from at least the first voice frequency modem call, as received from the first network modem 46, to a packet switch call having at least a first packet, the first packet being transmittable toward the first service provider 33 via the data network 70. In this regard, the packetizer 50 is interconnected to the first network modem 46 such that the output from the modem 46 may be received for packetizing by the packetizer 50. Furthermore, the packetizer 50 may be selected such that the packetizer 50 packetizes data from at least the first voice frequency call into packets transportable over corresponding data networks. For example, in instances where an Ethernet will be utilized, the packetizer 50 is capable of packetizing the data from at least the first voice frequency modem call into Ethernet packets. Similarly, where a frame relay network is utilized as the data network 70, the packetizer 50 is capable of packetizing the data from the first voice frequency modem call into frame relay packets. And, where an Asynchronous Transfer Mode ("ATM") network is utilized, the packetizer 50 is capable of packetizing the data from the first voice frequency modem call into ATM packets.

In order to facilitate transmittance of such packets over the data network 70 toward the appropriate service provider and to provide such service providers with a return address corresponding to the modem user, the packetizer 50 is capable of providing each of the packets with an address corresponding to the appropriate service provider and the appropriate packetizer ports through which data from voice frequency modem calls is routed. Such a packetizer 50 is a conventional device commercially available from various vendors.

For purposes of properly routing each packet to the appropriate service provider, the packetizer 50 may receive information from switch 34 or, alternatively, the AIN. In one embodiment, the AIN causes the switch 34 to forward to the packetizer 50 information concerning routing of the packets to the appropriate service provider. More specifically, the packetizer 50 may be interconnected to the switch 34 via a primary rate interface for ISDN D-channel such that information from the SCP 60 may be forwarded on the primary rate interface ISDN D-channel to the packetizer 50 via the switch 34. The packetizer 50 may thereafter utilize the termination telephone number to retrieve, from a data base server (e.g., Radius database server), the appropriate packet address for the service provider, based upon the termination telephone number provided. In an alternative embodiment, the packetizer 50 may interface directly with the AIN to obtain a service provider's address, based upon the termination telephone number of the voice frequency modem call from each modem user. Such an interface between the packetizer 50 and the AIN may be established via an SS7 network or X25 network.

To accommodate, for example, a plurality of modem users communicating with the first service provider 33 and/or a second service provider 37, the system 30 may also include a multiplexer for multiplexing packets from the modem users. In one embodiment, illustrated in FIG. 2, a multiplexer 80 may be associated with the packetizer 50 to multiplex packets from a plurality of modem users into a multiplexed stream transmittable toward the appropriate service provider via the data network 70. Such a multiplexer 80 may be located within the central office switch 34 and is a conventional system commercially available from various vendors, such as Ascend Communications.

According to the features of the present invention, the data network 70 is a packet switched data network capable of transporting data packets to and from specific addresses, in accordance with an address associated with each packet. As such, addressed packets are routed and/or transferred toward the appropriate service provider over channels of the data network, whereby a channel is only occupied during the transmission of a packet. The packet data switching may take the form of frame relay switching, asynchronous mode transfer switching, LAN bridging, private virtual circuits, or switched virtual circuits. In one embodiment, the data network 70 is a metropolitan area network. In another embodiment, the data network 70 is a wide area network, and, in an alternative embodiment, the data network 70 is a bridged Ethernet or an Internet style Intranet provider network. In order to transmit at least the first packet towards the first service provider 33, the data network 70 is interconnectable or electrically linkable to both the multiplexer 80 and the first and/or second service provider(s) 33, 37. The multiplexer 80 is interconnectable to the data network 70 via conventional devices and methods known by those skilled in the art (e.g., at least one of a router, bridge and switch).

Figure 3:
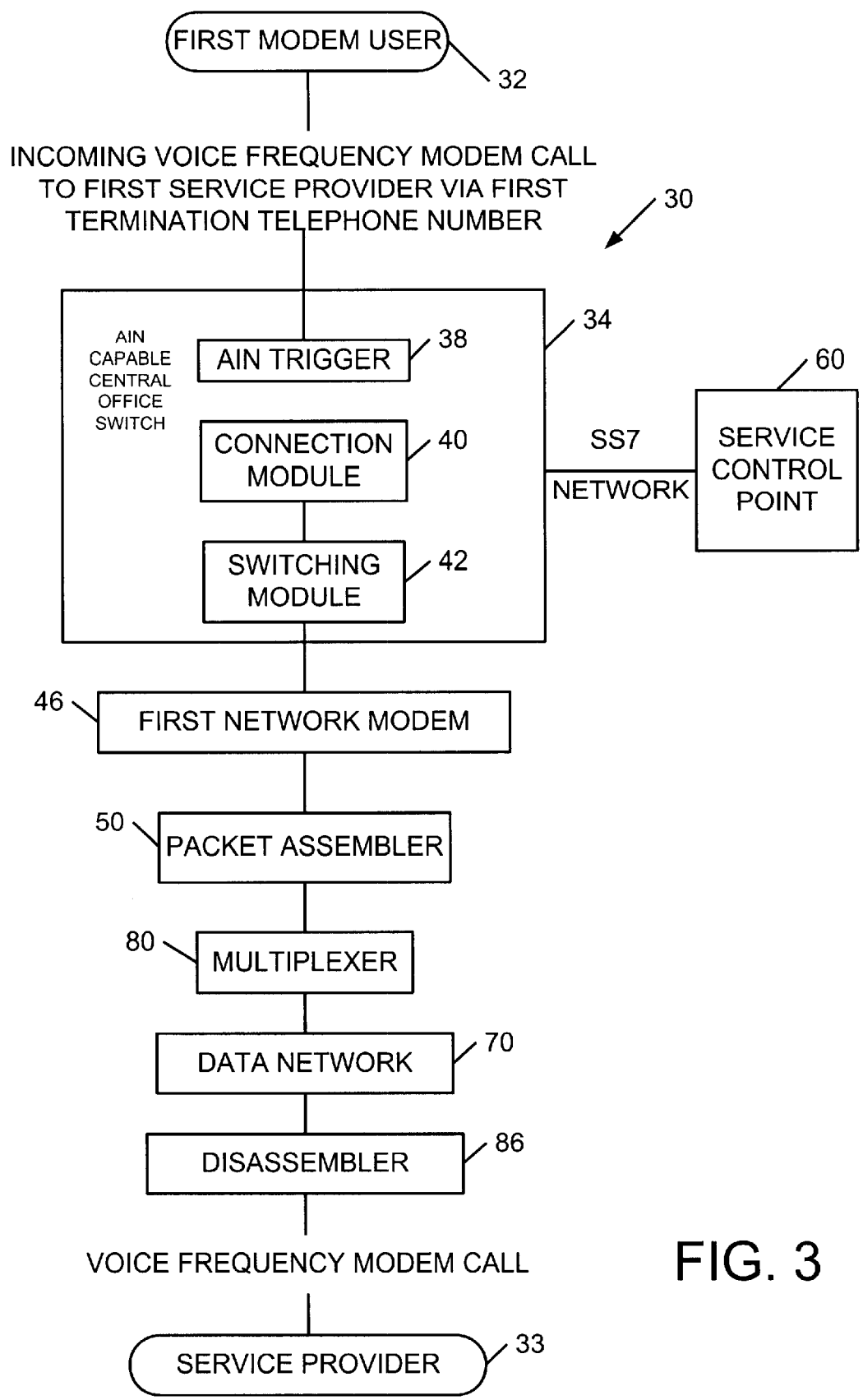
FIG. 3 is a diagrammatic illustration showing another embodiment of the system for using AIN to reduce voice switch and trunk loading, according to the features of the present invention.
Figure 4:
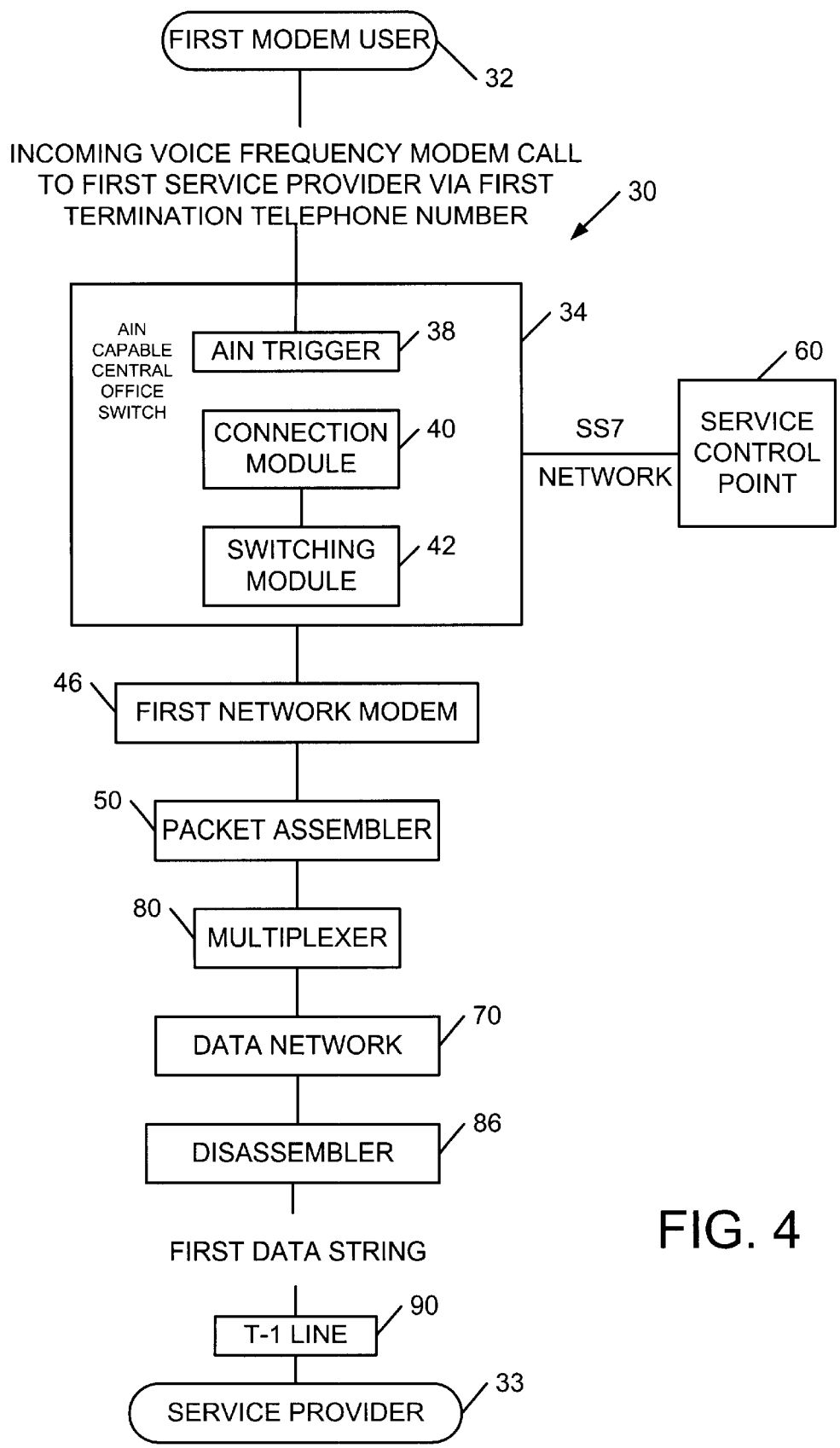
FIG. 4 is a diagrammatic illustration showing yet another embodiment of the system for using AIN to reduce voice switch and trunk loading, according to the features of the present invention.

As information or data from the first modem user 32 is deliverable to the first service provider 33 in a variety of forms (e.g., as packets, or channelized strings of data over T-1 line), the interconnection between the first service provider 33 and the data network 70 may vary. In instances where the first service provider 33 has the capability to disassemble or depacketize at least the first packet from at least the first modem user 32 and/or demultiplex packets, the system 30 may deliver information or data from at least the first modem user 32 in the form of packets (e.g., a packet switch call having at least a first packet). In this regard, the system 30 is capable of delivering at least the first packet to the first service provider 33 via the data network 70, as illustrated in FIG. 2. In an alternative embodiment, illustrated in FIG. 3, the system 30 discussed hereinabove with reference to FIG. 2 further includes a disassembler 86 capable of demultiplexing multiplexed packets and converting at least the first packet back into a voice frequency modem call having data, the modem call being completable to the first service provider at a point of presence associated with the first service provider, such that the data is deliverable to the first service provider via VF/TP data delivery systems. Such a disassembler 86 having the capability to demultiplex and depacketize packets is a conventional device known by those skilled in the art. In yet another alternative embodiment, illustrated in FIG. 4, the system 30 discussed hereinabove with reference to FIG. 2 further includes a disassembler 86 for demultiplexing multiplexed packets and converting at least the first packet into a first data string which is deliverable to the first service provider via a channelized data service, a second modem and a T-1 line 90, which are known by those skilled in the art. Such a disassembler 86 is a conventional device known by those skilled in the art. In one embodiment, the second modem is located at a terminating central office, or alternatively, at a central office capable of disassembling (e.g., depacketizing) the first packet into the first data string.

Figure 5:
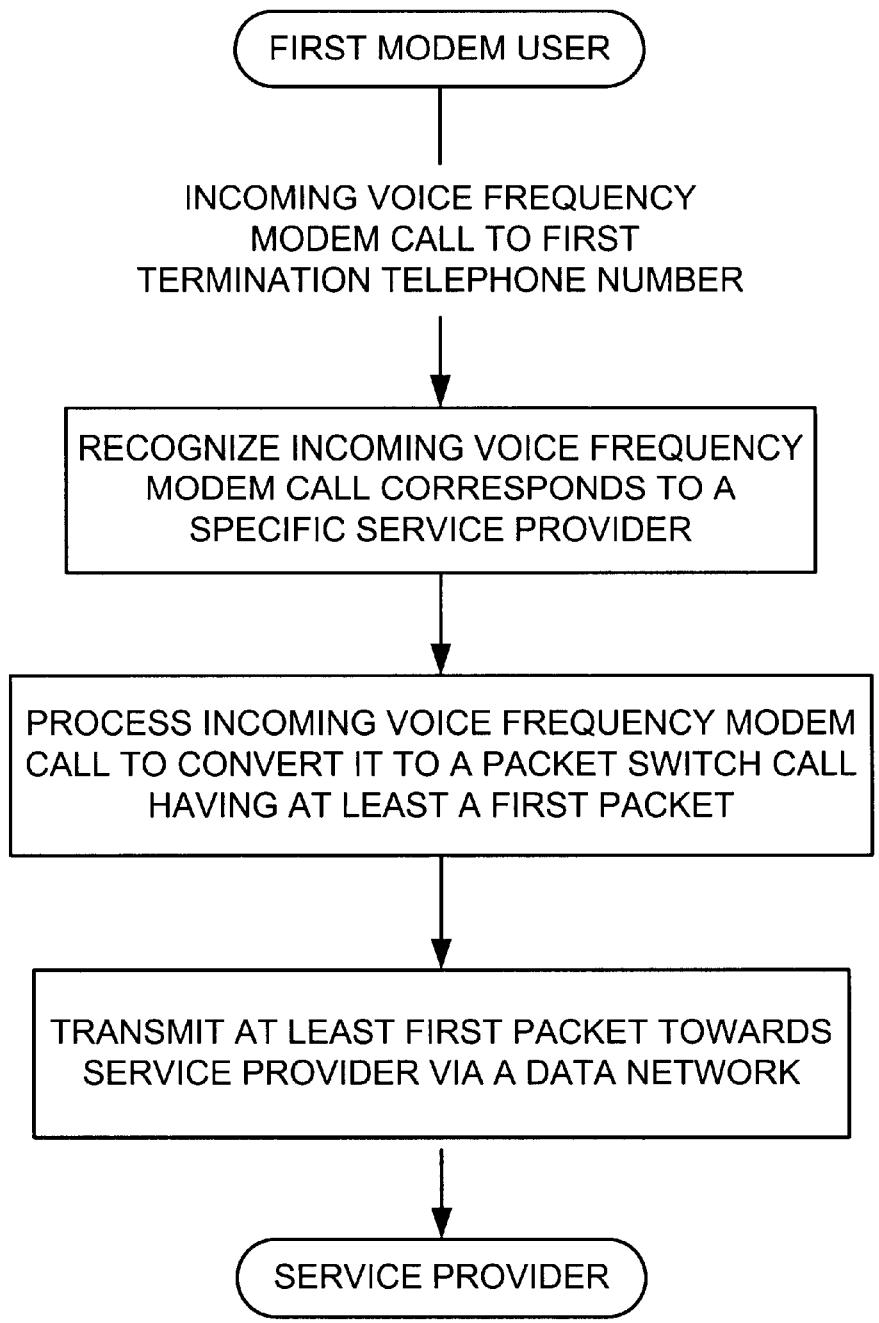
FIG. 5 presents a flow chart of one embodiment of the method of the present invention.

In another aspect, the present invention provides a method for handling voice frequency modem calls from modem users to service providers. FIGS. 5, 6A–6B, 7A–7B and 8A–8B illustrate various embodiments of the method of the present invention. Generally, the method of the present invention is directed to handling at least a first voice frequency modem call such that loading of such modem calls on dedicated voice networks (e.g., circuit switched voice networks) is alleviated by routing such calls to appropriate service providers over a data network (e.g., packet switched data network). In this regard, and as illustrated in FIG. 5, the method generally includes the steps of recognizing that a voice frequency call corresponds to a service provider, processing at least the first termination telephone number to direct the routing of the voice frequency modem call, processing the voice frequency modem call to convert the modem call to a packet switch call having at least a first packet, and transmitting at least the first packet towards the service provider via a data network linkable with the service provider. As such, the method of the present invention reduces voice switch and trunk loading over voice networks.

Figure 6A:
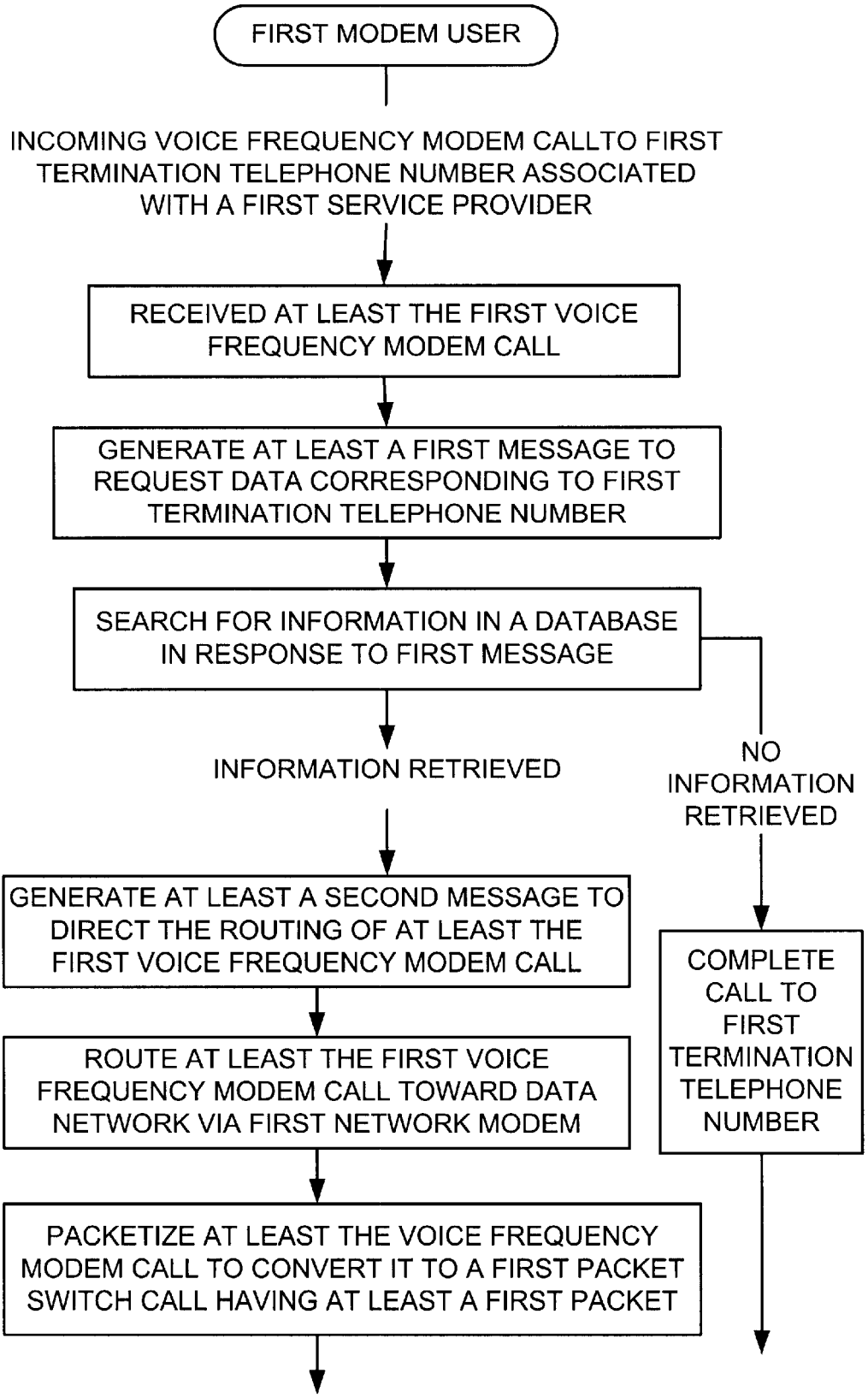
FIGS. 6A–6B present a flow chart of another embodiment of the method of the present invention.
Figure 6B:
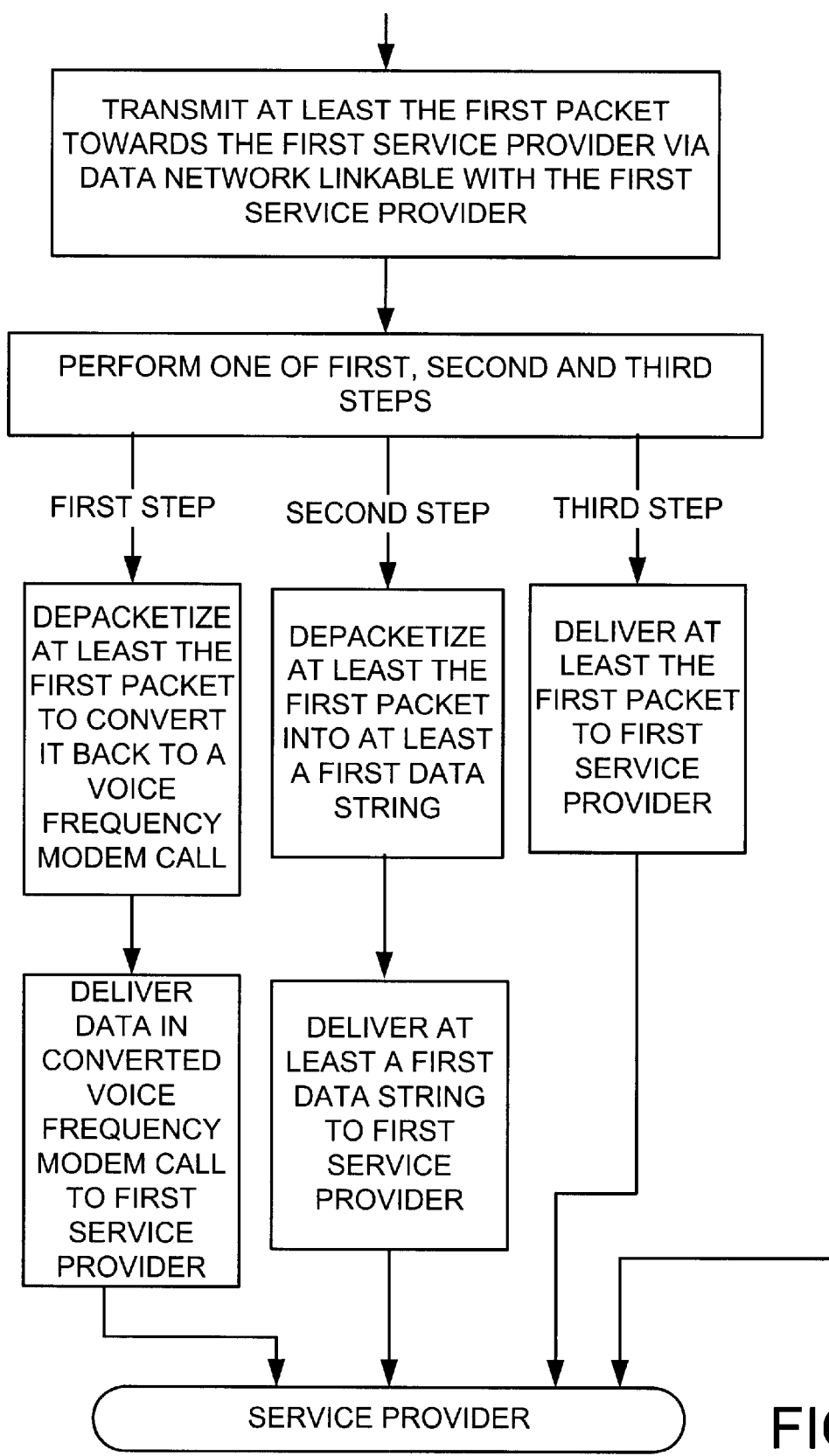
Figure 7A:
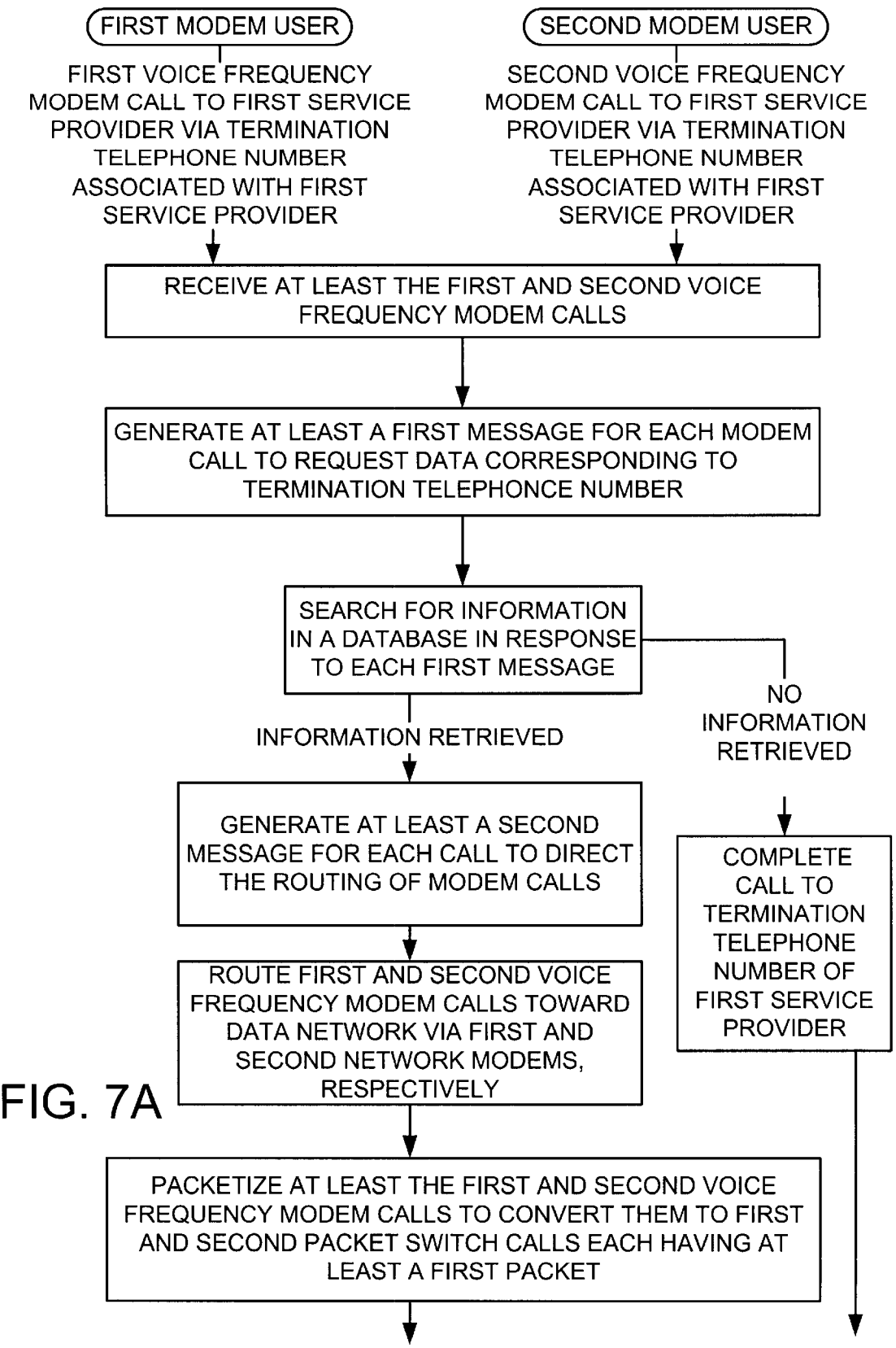
FIGS. 7A–7B present a flow chart of yet another embodiment of the method of the present invention.
Figure 7B:
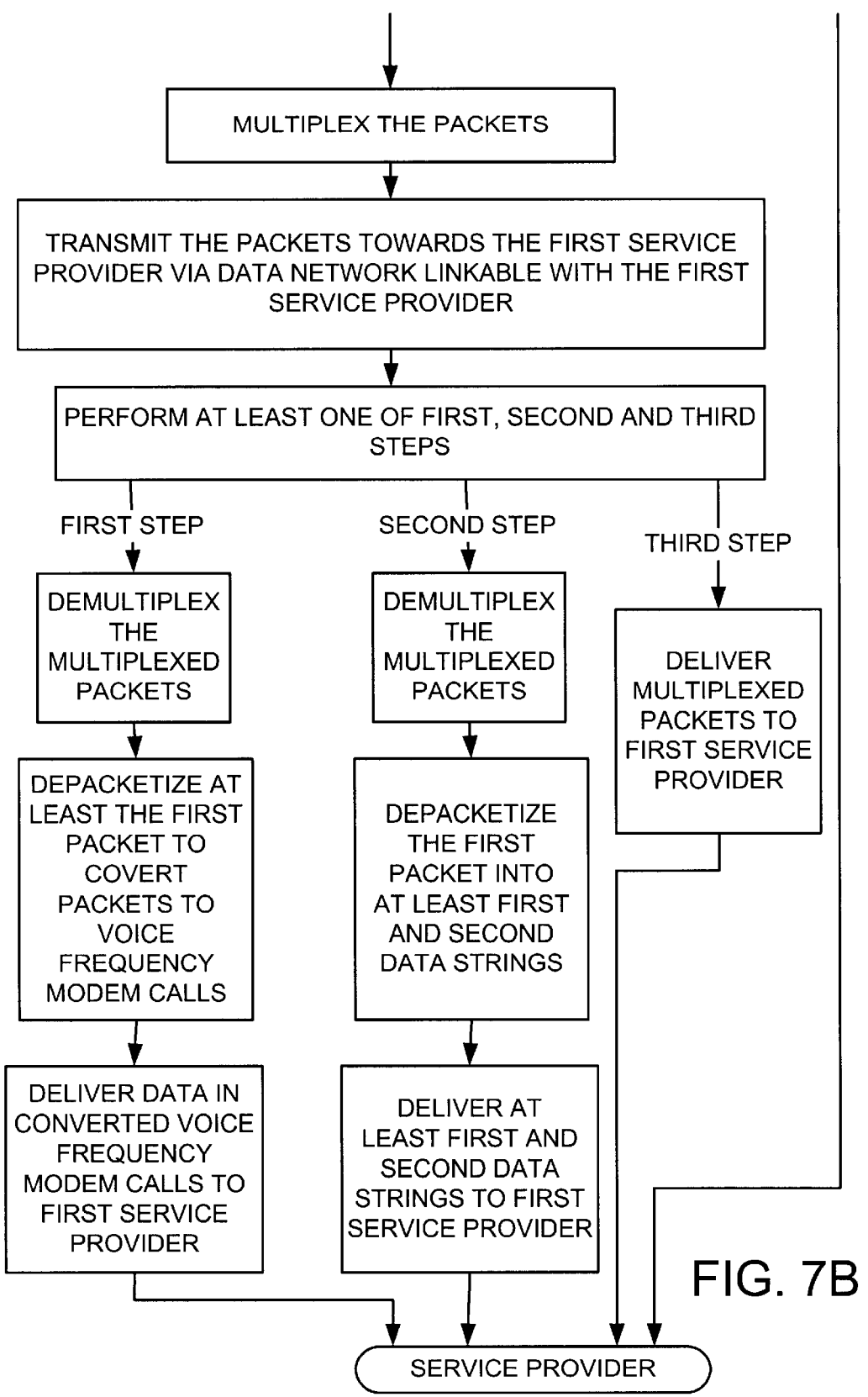
Figure 8A:
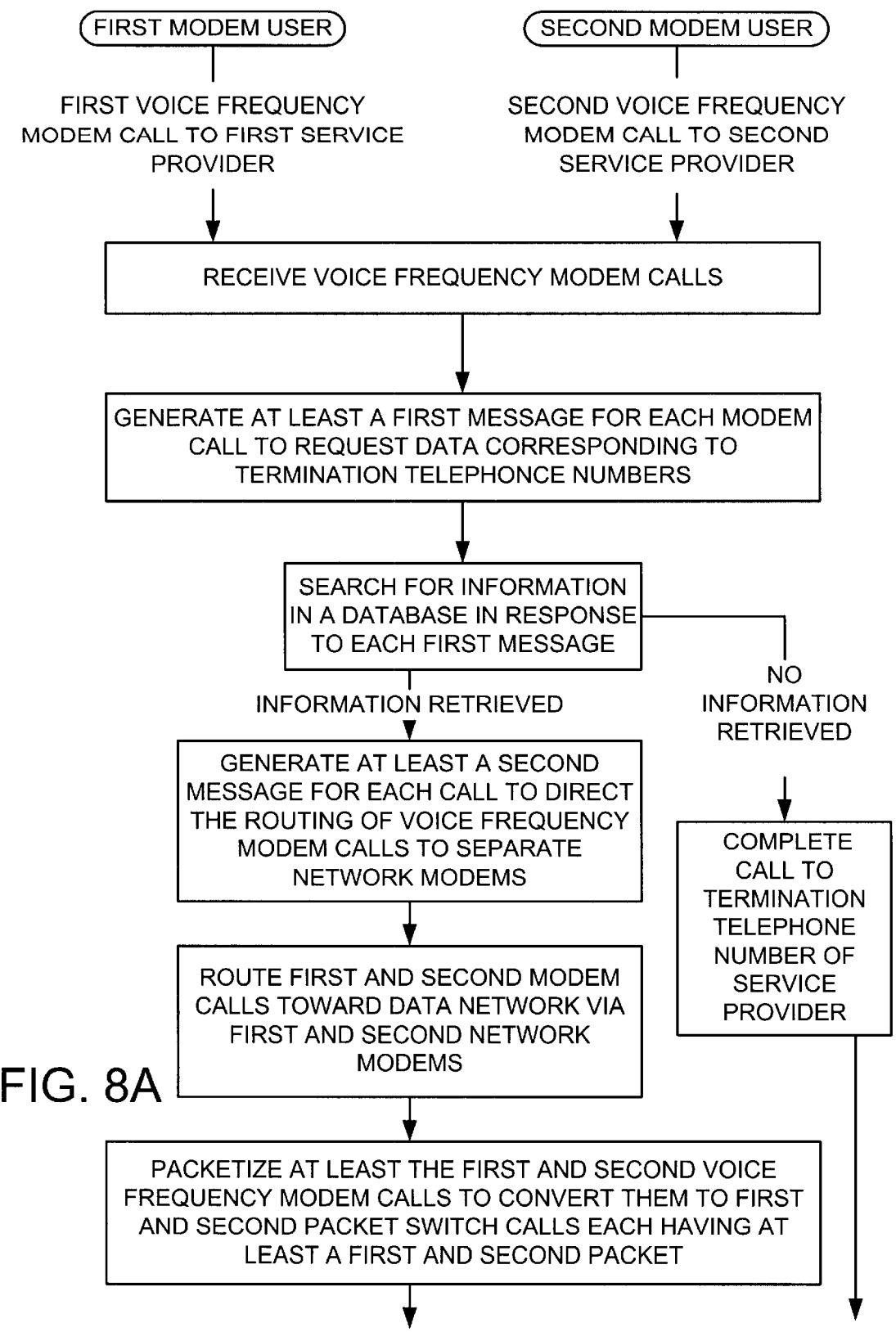
FIGS. 8A–8B present a flow chart of another embodiment of the method of the present invention.
Figure 8B:
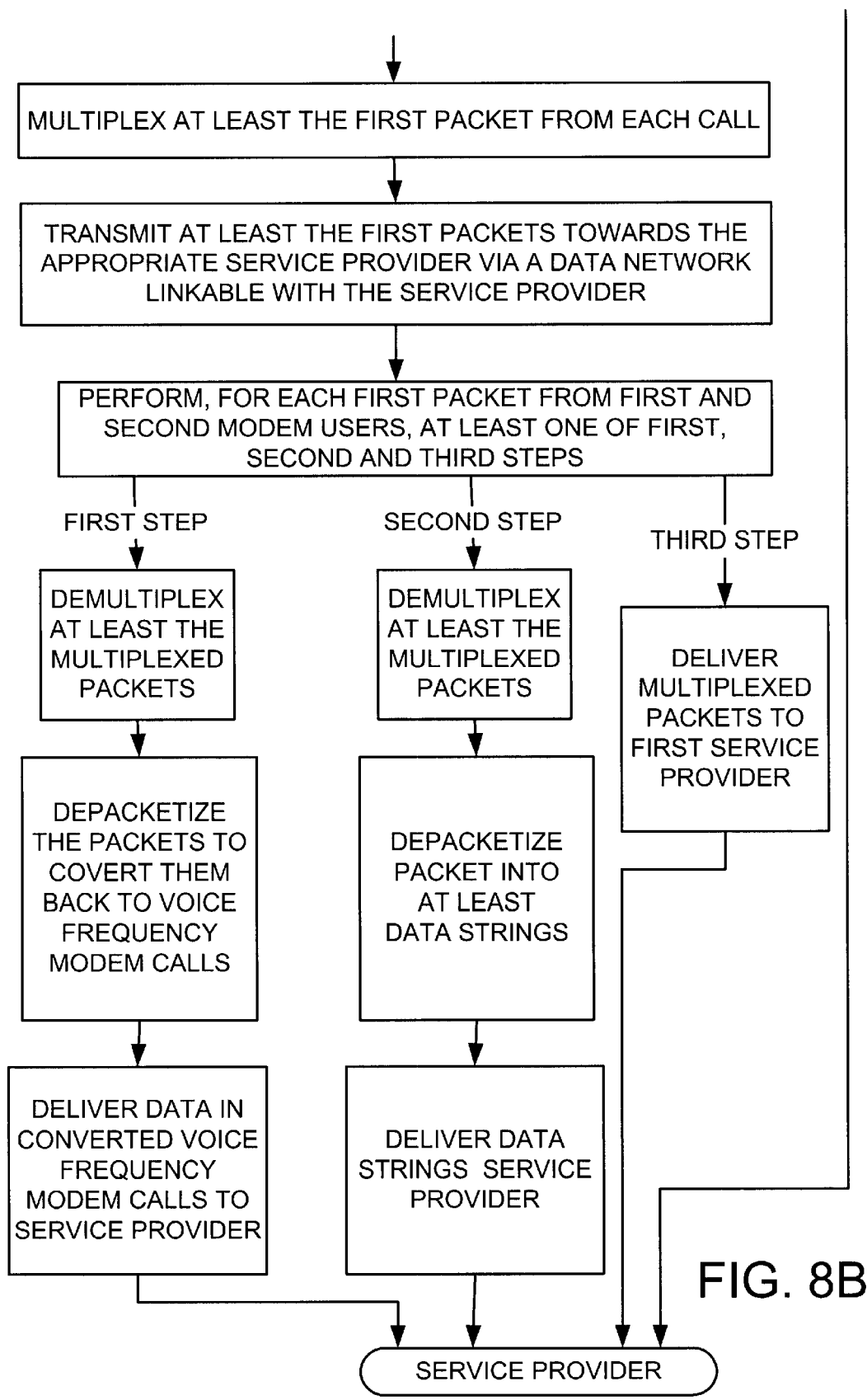

More specifically, and as illustrated in FIGS. 6A–6B, for purposes of properly processing the incoming modem call to the first termination telephone number associated with the first service provider, the step of recognizing the incoming voice frequency modem call from the first modem user to the first termination telephone number includes the steps of receiving the incoming voice frequency modem call to the first termination telephone number and identifying that the voice frequency modem call to the first termination telephone number corresponds to the first service provider. In this regard, the recognizing step identifies modem calls which are directed to service providers, based upon matching of the termination telephone numbers of service providers with the termination telephone number associated with each call received. In order to properly route each modem call, the method also includes the step of processing at least the first termination telephone number in order to retrieve information corresponding to the appropriate routing of the incoming voice frequency modem call. Such information may thereafter be used to direct the routing of the modem call toward the data network via a first network modem. In particular, in one embodiment, illustrated in FIGS. 6A–6B, the step of processing the first termination telephone number includes the steps of generating a first message (e.g., query) to request data corresponding to the first termination telephone number, searching, in response to the first message, a database to retrieve data or information corresponding to at least one of the first termination telephone number and the service provider associated therewith, and, where information or data is retrieved, generating a second message (e.g., instruction) to direct the routing of the voice frequency modem call to at least) a first network modem, wherein the second message is based upon data retrieved in the search of the database. In instances where no data or information is retrieved regarding how the modem call should be processed, illustrated in FIGS. 6A–6B, the method of the present invention includes the step of completing the modem call to the first termination telephone number over voice network and switch (e.g., Terminating Class V Switch) for VF/TP or VF/DSO data delivery. However, where information or data corresponding to the first termination telephone number or service provider associated therewith is retrieved, the instruction generated may dictate that the modem call be forwarded to the first network modem such that the modem call may be properly processed for transmittance toward the service provider via the data network. In one embodiment, AIN architecture is utilized to conduct the step of recognizing the incoming voice frequency modem call and processing at least the first termination telephone number. An AIN capable central office switch (e.g., originating Class V Switch), and in particular, an AIN trigger (e.g., Information Collected Trigger Detection Point) associated therewith may be used to receive the incoming voice frequency modem call, to suspend call processing and to generate the first message (e.g., query) to determine how the modem call is to be processed. A service control point having a database associated therewith and in electrical communication with the AIN central office switch may be utilized to conduct the search in response to the first message for information or data corresponding to the first termination telephone number and to generate the second message to direct the central office switch to route the modem call to a data network via a first network modem located within the AIN central office. In order to efficiently handle such a modem call, in one embodiment, the modem call is at least recognized at an originating central office switch, or, alternatively, at a central office switch proximate and/or interconnected to the originating central office switch.

Substantially as noted hereinabove and as illustrated in FIG. 5, upon recognition of the incoming voice frequency modem call, the method of the present invention contemplates processing the modem call to convert the voice frequency modem call to a packet switch call having at least a first packet, which is transmittable toward the service provider over a data network linkable to the service provider. In one embodiment of the method of the present invention, illustrated in FIGS. 6A–6B, the step of processing the modem call includes the step of packetizing the voice frequency modem call to convert the voice frequency modem call into a packet switch call. For purposes of ensuring the packetized data from the voice frequency modem call from the first modem user will be routed via the data network to and/or from the service provider, packetizing the voice frequency modem call may also include the step of addressing at least the first packet with information or data corresponding to the first service provider and/or the first modem user. In one embodiment, where a packetizer is used to packetize the voice frequency modem call, the packetizer also functions to address the packets with information corresponding to the appropriate address for the service provider and modem user. In this regard, the step of addressing at least the first packet may include the step of receiving, from the AIN, or, alternatively, from the AIN via a switch, information concerning the address of the appropriate service provider and attaching such address to each packet. For example, in one embodiment, the step of addressing at least the first packet includes the steps of forwarding, from the AIN, the termination telephone number corresponding to the voice frequency modem call to the packetizer and searching, in a data base associated with the packetizer, for the appropriate service provider address corresponding to the termination telephone number provided by the AIN.

As shown in the embodiments of the method illustrated in FIGS. 5 and 6A–6B, the method of the present invention includes the step of transmitting at least the first packet to the service provider via a data network. More specifically, for purposes of transmitting at least the first packet towards the service provider, the method of the present invention contemplates routing at least the first packet over the data network, towards the appropriate service provider. As such, in one embodiment of the invention, wherein at least an address associated with the service provider is provided with at least the first packet when the frequency voice modem call from the first modem user is converted (e.g., packetized) into a packet switch call having at least the first packet, the step of routing at least the first packet over the data network, towards the service provider, concerns routing or transporting at least the first packet in accordance with the address associated with the first packet.

In addition to transmitting (e.g., transporting) at least the first packet towards the service provider via the data network, the method of the present invention contemplates delivering at least the first packet or depacketized data to the service provider, depending upon the capabilities and/or preferences of the service provider and/or telephone service provider. In this regard, and as illustrated in FIGS. 6A–6B, 7A–7B and 8A–8B, the method of the present invention may further include the step of performing one of first, second and third steps.

In one instance, where, for example, the service provider wishes to receive data or information from at least the first modem user in the form of a voice frequency modem call, the method of the present invention includes performing the first step. In this regard, the first step includes the steps of depacketizing at least the first packet to convert the packet switch call having the first packet back to a voice frequency modem call and delivering the converted voice frequency modem call to the service provider. In addition, in order to facilitate depacketizing of at least the first packet, the first step may also include the step of routing at least the first packet from the data network to a depacketizer for disassembly. Such routing may be accomplished by utilizing an ATM network, a frame relay network or a router based Intranet network (e.g. an Internet like network). For purposes of efficiently utilizing the data network and reduce voice switch and trunk loading, depacketizing of the first packet may occur in the last central office that connects to the service provider's point of presence (e.g., terminating central office), or a central office proximate the terminating central office (e.g., a central office interconnected thereto). Further, where demultiplexed packets are to be transmitted to the service provider, the method also includes the step of demultiplexing the packets. As such, the service provider may receive at the service provider's point of presence data or information from the first modem user in the form of a voice frequency modem call.

In other instances, the method includes performing the second step in order to provide data or information from the first modem user to the service provider. More specifically, for purposes of delivering data or information from first modem user via the data network to the service provider, performing the second step includes the steps of demultiplexing the packets, if necessary, and depacketizing at least the first packet into at least a first data string corresponding to data sent by the first modem user in the first voice frequency modem call and delivering at least the first data string to the service provider over channelized data services and a T-1 line, which are known by those skilled in the art. For purposes of facilitating the depacketization of at least the first packet, performing the second step may also include the step of routing at least the first packet from the data network to a depacketizer capable of depacketizing at least the first packet to form at least a first data string. In order to efficiently utilize the data network and reduce voice switch and trunk loading, depacketizing of the first packet may occur in the last central office that connects to the service provider via the T-1 line (e.g., terminating central office), or a central office proximate the terminating central office (e.g., a central office interconnected thereto).

The method of the present invention also contemplates performing the third step to provide information or data from the first modem user to the appropriate service provider. In instances where the service provider is interconnectable or linkable to the data network and has the capability to at least disassemble packets (e.g., demultiplex and depacketize packetized data), performing the third step includes the step of delivering to the service provider at least the first packet via the data network. In this regard, packets need not be demultiplexed, depacketized or routed from the data network to a disassembler associated with a central office prior to delivery to the service provider.

As illustrated in FIGS. 7A–7B and 8A–8B, the method of the present invention also contemplates handling voice frequency modem calls from a plurality of modem user to a first and/or second service provider(s) in a manner substantially similar to the method described hereinabove in relation to the method illustrated in FIGS. 5 and 6A–6B. More specifically, in order to reduce voice switch and trunk loading, the method includes the steps of recognizing that the voice frequency incoming modem calls correspond to a specific service provider(s), processing the termination telephone numbers to direct the routing of each modem call, processing the modem calls to convert each of the voice frequency modem calls to packet switch calls having first packets, multiplexing the packets from each modem call, and transmitting at least the multiplexed packets corresponding to data or information provided by the modem users towards the appropriate service provider via a data network.

More specifically, in one embodiment of the method of the present invention, illustrated in FIGS. 7A–7B and 8A–8B, the step of recognizing the first and second voice frequency modem calls includes the steps of receiving at least the first and second voice frequency modem calls from the first and second modem users, generating at least a first message (e.g., query) for each modem call to request data (e.g., first and second sets of information) corresponding to termination telephone number(s) used by the first and second modem users, searching, for each modem call, for information in a database in response to each of the first messages, and, where first and second sets of data or information are retrieved, generating at least a second message for each call to direct the routing of the first and second voice frequency modem calls to a modem bank in a central office having first and second modems. As such, data network interconnections between the appropriate service provider(s) and the first and second modem users, respectively, are established. For purposes of recognizing that such modem calls correspond to a service provider, an AIN, and specifically, a central office switch having an AIN trigger associated therewith and a service control point having a database associated therewith may be utilized, substantially as described hereinabove.

In order to reduce voice switch and trunk loading, the method of the present invention contemplates processing at least the first and second voice frequency modem calls to convert them into first and second packet switch calls each having at least a first packet. In this regard, and as illustrated in FIGS. 7A–7B and 8A–8B, the processing step includes packetizing at least the first and second voice frequency modem calls to convert the modem calls into first and second packet switch calls each having at least a first packet, which are transmittable over the data network linkable to the appropriate service provider. Furthermore, for purposes of efficiently transferring the first packets to the appropriate service provider over the data network, the method of the present invention, illustrated in FIGS. 7A–7B and 8A–8B, further includes the step of multiplexing the first packets such that multiplexed packets are transferred over the data network towards the appropriate service provider.

In addition to transmitting (e.g., transporting) the multiplexed packets towards the appropriate service provider via the data network, the method of the present invention contemplates delivering at least the multiplexed first packets to the appropriate service provider, or alternatively, delivering demultiplexed and depacketized data to the service provider, depending upon the capabilities and/or preferences of the service provider and/or telephone service provider. In this regard, and as illustrated in FIGS. 7A–7B and 8A–8B, the method of the present invention may further include the step of performing one of first, second and third steps.

In one instance, where, for example, the service provider wishes to receive data or information from the first and/or second modem user in the form of a voice frequency modem call, the method of the present invention includes performing the first step, illustrated in FIGS. 7A–7B and 8A–8B. In this regard, the first step includes the steps of demultiplexing the multiplexed packets into first packets corresponding to data or information in the first and second packet switch calls sent by the first and second modem users, respectively, depacketizing at least the first packets to convert the first and second packet switch calls back to a voice frequency modem calls and delivering at least data in the converted voice frequency modem calls to the appropriate service provider. In addition, in order to facilitate demultiplexing of at least the multiplexed first packets, the first step may also include the step of routing at least the first multiplexed packets from the data network to a demultiplexer. Such routing may be accomplished, for example, by utilizing an ATM network. For purposes of efficiently utilizing the data network and reduce voice switch and trunk loading, demultiplexing and/or depacketizing of the first packets may occur in the last central office that connects to the service provider's point of presence (e.g., terminating central office), or a central office proximate the terminating central office (e.g., a central office interconnected thereto). As such, the service provider may receive at the service provider's point of presence data or information from the first modem user in the form of first and second voice frequency modem calls from the first and second modem users, respectively.

In other instances, the method includes performing the second step in order to provide data or information from the first and/or second modem users to the appropriate service provider. More specifically, for purposes of delivering data or information from first and/or second modem users via the data network to a service provider, performing the second step includes the steps of demultiplexing at least the multiplexed packets into first packets corresponding to data or information sent by the first and second modem users, depacketizing at least the first packets into at least first and second data strings corresponding to data sent by the first and second modem users in the first and second voice frequency modem calls, respectively, and delivering at least the first and second data strings to the appropriate service provider over channelized data services and a T-1 line, which are known by those skilled in the art. For purposes of facilitating the demultiplexing of at least the multiplexed packets, performing the second step may also include the step of routing at least the first packets from the data network to a demultiplexer capable of demultiplexing at least the first multiplexed packets to form at least first packets for each modem call. In order to efficiently utilize the data network and reduce voice switch and trunk loading, demultiplexing and/or depacketizing of the first packets for each modem call may occur in the last central office that connects to the service provider via the T-1 line (e.g., terminating central office), or a central office proximate the terminating central office (e.g., a central office interconnected thereto).

The method of the present invention, illustrated in FIGS. 7A–7B and 8A–8B also contemplates performing the third step to provide information or data from the first and/or second modem users to the appropriate service provider. In instances where a service provider is interconnectable or linkable to the data network and has the capability to at least demultiplex the multiplexed packets and/or depacketize packetized data (e.g., at least the first packets corresponding to data sent by the first and second modem users in the first and second voice frequency modem calls, respectively), performing the third step includes the step of delivering to the service provider at least the multiplexed packets via the data network. In this regard, where the service provider has the capability to demultiplex multiplexed packets and to depacketized the resulting first packets, the multiplexed first packets need not be demultiplexed and depacketized prior to delivery to the service provider.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for processing a voice frequency telephone call within a telephone network from at least a first person to a first termination telephone number associated with a first service provider, said method comprising the steps of:

receiving at a central office switch in the telephone network at least one voice frequency call, each including a terminating telephone number;

searching a database using the terminating telephone number to determine if the terminating telephone number is associated with a first termination telephone number for a first service provider;

based on the association of the termination telephone number of the first service provider, processing at least the first termination telephone number to direct the routing of the voice frequency call toward a data network via a first network modem; and processing the voice frequency call to convert the at least one voice frequency call to a packet switch call having at least a first packet, wherein the first packet is transmittable toward the first service provider via the data network, the first service provider being interconnectable to the data network.

2. A method, as claimed is claim 1, wherein said recognizing step comprises the steps of:

receiving the at least one voice frequency call to the first termination telephone number via a first user modem; and identifying the at least one voice frequency call corresponds to the first service provider.

3. A method, as claimed in claim 1, wherein said processing at least the first termination telephone number step comprises the steps of:

generating a first message to request data corresponding to at least the first termination telephone number;

searching, in response to the first message, the database to retrieve data corresponding to at leas the first termination telephone number, the data being stored in the database; and generating a second message to direct the routing of the at least one voice frequency call to the first service provider via at least the first network modem and the data network, the second message being based upon data retrieved during said searching step.

4. A method, as claimed in claim 3, wherein said generating the first message step is performed by an AIN trigger associated with an AIN capable switch.

5. A method, as claimed in claim 4, wherein the trigger for generating the first message is an Information Collected Trigger Detection Point.

6. A method, as claimed in claim 4, wherein at least the switch is located in one of an originating central office receiving the at least one voice frequency call from the first person and a central office interconnected to the originating central office.

7. A method, as claimed in claim 3, wherein said searching and said generating the second message steps are performed by a service control point associated with the database.

8. A method, as claimed in claim 1, wherein said processing the at least one voice frequency call step comprises packetizing data in the voice frequency call from the first person to the packet switch call having at least the first packet.

9. A method, as claimed in claim 1, further comprising before said processing the voice frequency call step, the step of:

routing the at least one voice frequency call toward the data network via the first network modem.

10. A method, as claimed in claim 1, further comprising after said processing the at least one voice frequency call step, the step of:

transmitting at least the first packet toward the first service provider via the data network.

11. A method, as claimed in claim 1, further comprising the step of:

delivering at least the first packet to the first service provider.

12. A method, as claimed in claim 1, further comprising the steps of:
- depacketizing at least the first packet from the first person to convert the packet switch call back to a voice frequency call; and
- delivering data from the converted voice frequency call from the first person to the first service provider.

13. A method, as claimed in claim 1, further comprising the steps of:
- depacketizing at least the first packet from the first person into at least a first data string corresponding to the first person; and
- delivering at least the first data string to the first service provider via a second modem associated with the first service provider and a T-1 line.

14. A method, as claimed in claim 1, further comprising the step of:
- multiplexing at least the first packet from the first person with a first packet from a second person communicating with one of the first service provider and a second service provider, wherein the first packet from the second person is transmittable toward the one of the first and second service providers via the data network.

15. A method for establishing within a telephone network communication between at least a first modem user and a first service provider via a first voice frequency modem call initiated by the first modem user to a first termination telephone number associated with the first service provider, said method comprising the steps of:
- receiving at a central office switch within the telephone network at least one voice frequency call, wherein each of the at least one voice frequency calls includes a terminating telephone number;
- searching a database using the terminating to determine if the terminating telephone number is associated with a first service provider;
- retrieving a first set of information associated with a first terminating telephone number of the first service provider concerning routing of the at least one voice frequency call, wherein the first set of information corresponds to the first service provider;
- based on the processing of the first termination telephone number, routing the first voice frequency modem call toward a data network via a first network modem;
- processing the first voice frequency modem call from the first modem user to convert the first frequency modem call to a first packet switch call having at least a first packet; and
- transmitting at least the first packet toward the first service provider via the data network, wherein the first service provider is interconnectable to the data network.

16. A method, as claimed in claim 15, wherein said retrieving a first set of information comprises the steps of:
- receiving the first voice frequency modem call to the first termination telephone number via a first user modem associated with the first modem user;
- generating a first message having a query to request data corresponding to the first termination telephone number;
- searching, based upon the query, a database to retrieve data corresponding to at least the first termination telephone number, the data being stored in the database; and
- generating a second message having at least one instruction concerning routing of the first voice frequency modem call to the first network modem, the instruction being based upon data retrieved during said searching step.

17. A method, as claimed in claim 16, wherein said generating the first message step is performed by a trigger associated with an Advanced Intelligent Network capable switch.

18. A method, as claimed in claim 16, wherein said searching and generating the second message steps are performed by a service control point associated the database.

19. A method, as claimed in claim 15, wherein said processing the first voice frequency modem call step comprises the step of packetizing the first voice frequency modem call into the first packet switch call having at least the first packet, the first packet being transmittable toward the first service provider via the data network.

20. A method, as claimed in claim 15, wherein a second modem user initiates, via a second user modem, a second voice frequency modem call to one of the first and a second termination telephone number associated with the first service provider, said method further comprising the steps of:
- processing the one of the first and second termination telephone numbers to retrieve a second set of information concerning routing of the second voice frequency modem call, wherein the second set of information corresponds to the first service provider;
- routing the second voice frequency modem call toward the data network via a second network modem;
- processing the second voice frequency modem call from the second modem user to convert the second voice frequency modem call to a second packet switch call having at least a first packet; and
- transmitting at least the first packet from the second packet switch call toward the first service provider via the data network.

21. A method, as claimed in claim 20, further comprising the steps of:
- multiplexing at least the first packets from first and second packet switch calls for transmittance toward the first service provider via the data network.

22. A method, as claimed in claim 15, further comprising the step of performing one of first and second steps, wherein said first step comprises the steps of depacketizing at least the first packet from the first modem user to convert the packet switch call back to a voice frequency modem call and delivering the converted voice frequency modem call to the first service provider, wherein said second step comprises depacketizing at least the first packet from the first modem user into at least a first data string corresponding to the first modem user and delivering at least the first data string to the service provider via a second modem associated with the first service provider and a T-1 line.

23. A method, as claimed in claim 15, wherein a second modem user initiates, via a second user modem, a second voice frequency modem call to a second termination telephone number associated with a second service provider, said method further comprising the steps of:
- processing the second termination telephone number to retrieve a second set of information concerning routing of the second voice frequency modem call, wherein the second set of information corresponds to the second service provider;
- routing the second voice frequency modem call toward the data network via a second network modem;
- processing the second voice frequency modem call from the second modem user to convert the second voice frequency modem call to a second packet switch call having at least a first packet;

multiplexing at least the first packets from the first and second packet switch calls; and transmitting at least the first packets from the first and second packet switch calls toward the first and second service providers via the data network.

24. A system for a telephone network which automatically directs identified voice frequency calls a first service provider, said system comprising:

at least one central office switch for receiving at least one voice frequency call wherein the central office switch is further configured to identify a terminating telephone number associated with the at least one voice frequency call and to search a database to identify information associated with the terminating telephone number, the database is configured to include at least a first terminating telephone number for a first service provider, which is provided upon detection of a first voice frequency call which includes the first terminating telephone number;

first processing means for receiving and routing the first voice frequency call toward a data network via a first network modem;

converting means, interconnected to said first processing means, for receiving the first voice frequency call from said first network modem and packetizing the first voice frequency call into a first packet switch call having at least a first packet, said first packet of said first packet switch call being transmittable toward the first service provider via the data network interconnecting the first service provider and said converting means.

25. A system, as claimed in claim 24, wherein said switch comprises an AIN capable switch capable of matching the first termination telephone number with the first service provider.

26. A system, as claimed in claim 24, wherein said first processing means comprises:

receiving means for generating at least a first message having a query corresponding at least to the first termination telephone number; and second processing means, interconnected to said receiving means, for retrieving from a database information in response to the first message, wherein said database is associated with said second processing means.

27. A system, as claimed in claim 26, wherein said receiving means comprises an AIN capable switch having an AIN trigger capable of at least generating said first message.

28. A system, as claimed in claim 26, wherein said second processing means comprises a service control point for retrieving information corresponding to the first termination telephone number from said database associated with said service control point and for instructing said receiving means to route the first voice frequency call to said first network modem.

29. A system, as claimed in claim 24, wherein said first network modem is located in a central office associated with said first processing means.

30. A system, as claimed in claim 24, wherein said converting means comprises a packet assembler interconnected to said data network.

31. A system, as claimed in claim 24, wherein said data network is a packet switched data network selected from the group consisting of a wide area network, a metropolitan area network, an Ethernet, a frame network, an asynchronous transfer mode network, an internet protocol network and a switch multimegabit data service network.

32. A system, as claimed in claim 24, further comprising:

depacketizing means, associated with said data network, for converting at least said first packet into at least a first data string corresponding to the first modem user, said first data string being deliverable to the first service provider via a first service provider modem associated with the first service provider and a T-1 line.

33. A system, as claimed in claim 24, further comprising:

depacketizing means, associated with said data network, for converting at least said first packet back into a voice frequency call, said converted voice frequency call being deliverable to the first service provider via a first service provider modem at a point of presence of the first service provider.

34. A system, as claimed in claim 24, further comprising:

multiplexing means, associated with said converting means, for multiplexing said first packet from said first packet switch call and a first packet from a second packet switch call for transmittance to at least one of the first service provider and a second service provider, wherein said converting means is capable of packetizing a second voice frequency call from a second modem user into the second packet switch call having at least the first packet.

* * * * *